US011537397B2

(12) United States Patent
Khorasani et al.

(10) Patent No.: US 11,537,397 B2
(45) Date of Patent: Dec. 27, 2022

(54) COMPILER-ASSISTED INTER-SIMD-GROUP REGISTER SHARING

(71) Applicant: Advanced Micro Devices, Inc., Santa Clara, CA (US)

(72) Inventors: Farzad Khorasani, Houston, TX (US); Amin Farmahini-Farahani, Santa Clara, CA (US); Nuwan S. Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 180 days.

(21) Appl. No.: 15/935,399

(22) Filed: Mar. 26, 2018

(65) Prior Publication Data

US 2018/0275991 A1     Sep. 27, 2018

Related U.S. Application Data

(60) Provisional application No. 62/477,269, filed on Mar. 27, 2017.

(51) Int. Cl.
*G06F 9/30* (2018.01)
*G06F 15/80* (2006.01)
*G06F 9/38* (2018.01)
*G06F 9/50* (2006.01)

(52) U.S. Cl.
CPC ........ *G06F 9/30138* (2013.01); *G06F 9/3009* (2013.01); *G06F 9/30076* (2013.01); *G06F 9/30123* (2013.01); *G06F 9/3851* (2013.01); *G06F 9/5011* (2013.01); *G06F 15/8007* (2013.01)

(58) Field of Classification Search
CPC ............. G06F 9/30138; G06F 9/30076; G06F 9/3009; G06F 9/30123; G06F 9/3851; G06F 9/5011; G06F 15/8007
See application file for complete search history.

(56) References Cited

U.S. PATENT DOCUMENTS 5,826,082 A * 10/1998 Bishop .................. G06F 9/5011
718/104
5,996,068 A * 11/1999 Dwyer, III ............ G06F 9/3851
712/217

(Continued)

*Primary Examiner* — Corey S Faherty
(74) *Attorney, Agent, or Firm* — Kowert Hood Munyon Rankin and Goetzel PC; Rory D. Rankin

(57) ABSTRACT

Systems, apparatuses, and methods for efficiently sharing registers among threads are disclosed. A system includes at least a processor, control logic, and a register file with a plurality of registers. The processor assigns a base set of registers to each thread of a plurality of threads executing on the processor. When a given thread needs more than the base set of registers to execute a given phase of program code, the given thread executes an acquire instruction to acquire exclusive access to an extended set of registers from a shared resource pool. When the given thread no longer needs additional registers, the given thread executes a release instruction to release the extended set of registers back into the shared register pool for other threads to use. In one implementation, the compiler inserts acquire and release instructions into the program code based on a register liveness analysis performed during compilation.

20 Claims, 13 Drawing Sheets

(56) References Cited

U.S. PATENT DOCUMENTS

2003/0135716 A1\* 7/2003 Vinitzky .............. G06F 9/3851
             712/220
2007/0143582 A1  6/2007 Coon et al.
2011/0296428 A1\* 12/2011 Rawson, III ........ G06F 9/30098
             718/104

\* cited by examiner

COMPILER-ASSISTED INTER-SIMD-GROUP REGISTER SHARING

CROSS REFERENCE TO RELATED APPLICATIONS

This application claims priority to Provisional Patent Application Ser. No. 62/477,269, entitled "Compiler-Assisted Inter-SIMD-group Register Sharing", filed Mar. 27, 2017, the entirety of which is incorporated herein by reference.

BACKGROUND

Description of the Related Art

Modern processors include a variety of circuits and components to facilitate fast and efficient computation. For example, a variety of types of memory structures are designed to store data. Registers are one type of memory structure used in computing devices. While registers are relatively small compared to other memory structures, they often represent among the fastest available memory to programs running on the device. Registers are also typically kept closer to the circuitry performing computations and usually are the most expensive form of memory in a machine. A set of registers for use by a processor are typically packed into a structure called a register-file. In some computing devices, such as single-instruction-multiple-data (SIMD) devices, the device architecture employs a relatively large register file in which registers are statically assigned to threads in order to enable thousands of threads to be simultaneously resident in the processor.

Program code that executes on a processor works with a set of addressable registers. These registers are referred to as "architectural registers" and are mapped to physical registers by the processor's hardware. To map architectural registers to physical registers, typical central processing units (CPUs) utilize a mechanism called register renaming. On the other hand, graphics processing units (GPUs) typically use a different method for mapping architectural registers to physical registers. For example, GPUs sometimes use a mapping that allows a simple Y=X+B equation for each SIMD group to calculate its physical register indices where B is the base address of the block of registers assigned at run time to the specific SIMD group, X is the architectural register index (i.e., the offset into the block of registers), and Y gives the physical register index. This simple mapping approach avoids the overhead of performing register renaming for thousands of concurrently running threads. In such cases, the set of physical registers is statically reserved for the life of the SIMD group (i.e., B is constant for the duration of the SIMD group's execution), and becomes available for other threads only after the SIMD group retires. As used herein, the term "SIMD group" is defined as a group of threads executing on a SIMD unit. A "thread" is one of a collection of parallel executions of a kernel. A kernel is also referred to as a "GPU program" herein. A group of threads is also referred to herein as a "warp" or "wavefront". A "warp" is also referred to herein as a "program" or a "multi-threaded program".

One drawback of the above scheme, especially compared to traditional register renaming schemes, is physical register underutilization. The static reservation mentioned above is conservative in the sense that it requests the maximum number of registers that may be alive at any point during the program. The term "alive" as used herein in reference to a register is defined as the register storing a value which has a non-zero probability of being used again by a subsequent instruction of the program. The static reservation scheme makes a worst case assumption and uses that assumption to determine how many registers to reserve. However, during program execution of the SIMD group, the reserved physical registers are typically not all alive at any given time. In fact, the time interval in which all of the requested physical registers are used might be a very small portion of the execution time.

Another drawback of the aforementioned scheme is it limits the occupancy for GPU programs ("kernels") asking for a high number of architectural registers. Occupancy refers to the ratio of the number of threads residing on the computation unit or streaming multiprocessor (CU/SM) over the maximum number of threads that SIMD group schedulers in the CU/SM allow for residency. For example, on some devices, there can be up to 40, 64, or some other number of resident wavefronts. The higher the occupancy, the more the number of candidate SIMD groups to be executed by the CU/SM at any given time. This enables the processor (e.g., GPU) cores to hide memory access latencies more effectively through having more concurrent SIMD groups. It is noted that higher occupancy does not necessarily lead to better performance due to possible side-effects such as cache pollution. However, a lower occupancy can cause resource underutilization. Generally speaking, a SIMD group that requires a high number of registers lowers the SIMD occupancy. In other words, a SIMD group that requires a high number of registers disallows co-residency of other SIMD groups due to register file resource limitations. However, it may actually turn out that the SIMD group with the high register requirement may only need excessive registers for a short period of the program. Consequently, many registers go unused. In view of the above, efficient methods and systems for managing register allocation in a processor are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for efficiently sharing registers among threads are disclosed herein. A system includes at least a processor, control logic, and a register file with a plurality of registers. In one implementation, the processor assigns a base set of registers to each thread executing on the processor. In another implementation, the processor assigns a base set of registers to individual threads and/or groups of threads executing on the processor. When a given thread needs more than the base set of registers to execute a given phase of program code, the given thread executes an acquire instruction to acquire an extended set of registers from a shared resource pool. The extended set of registers is then available for the exclusive use of the given thread for the given phase of program code. When the given thread no longer needs additional registers, the given thread executes a release instruction to release the extended set of registers back into the shared register pool for other threads to use. In one implementation, the compiler inserts acquire and release instructions into the program code based on a register liveness analysis performed during compilation.

Figure 1:
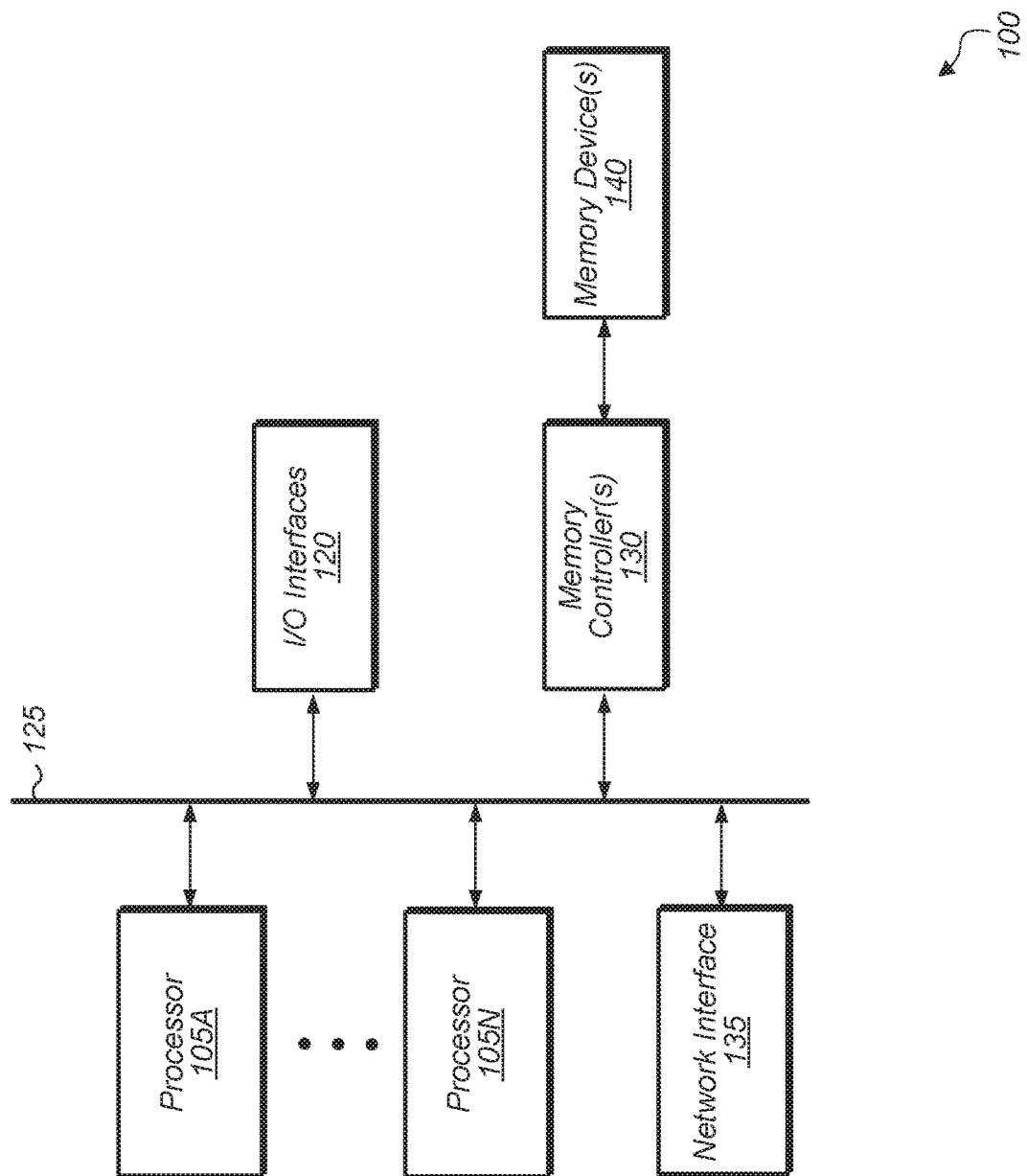
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, one or more of processors 105A-N include a register file which includes base register sets and extended register sets. In one implementation, each thread is assigned a base register set for use during execution. When the register usage by the thread exceeds the number of registers in the base register set, the thread executes an acquire instruction to acquire the use of an extended register set. In one implementation, the acquire instruction is inserted into the program code of the thread by a compiler. When the register usage falls back equal to or below the number of registers in the base register set, the thread executes a release instruction to release the extended register set back into the shared resource pool for other threads to use. In one implementation, the acquire and release instructions are inserted into the program code of the thread by a compiler based on a register liveness analysis of the thread performed during compilation.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB), NVLink®). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
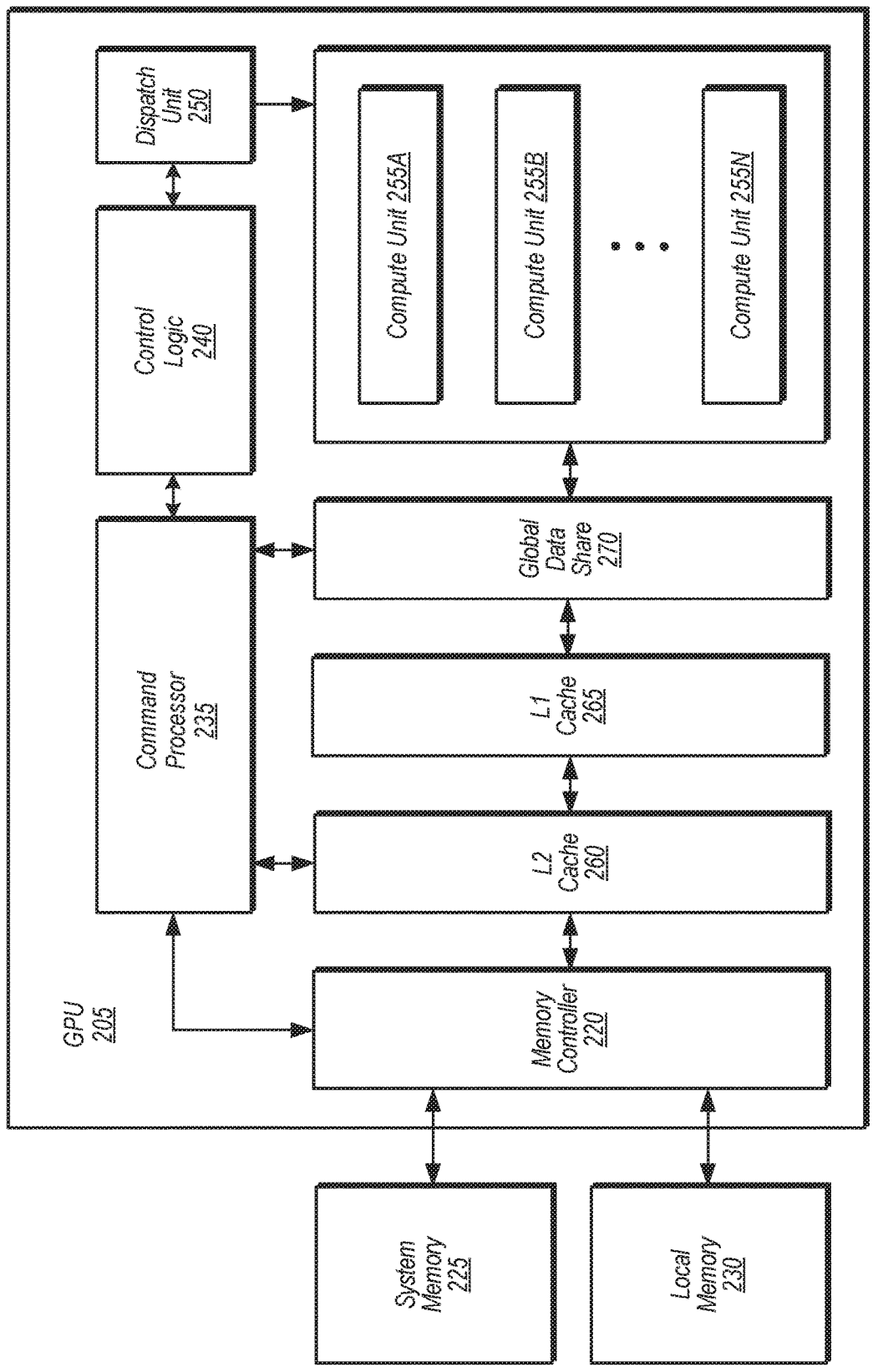
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners.

Figure 3:
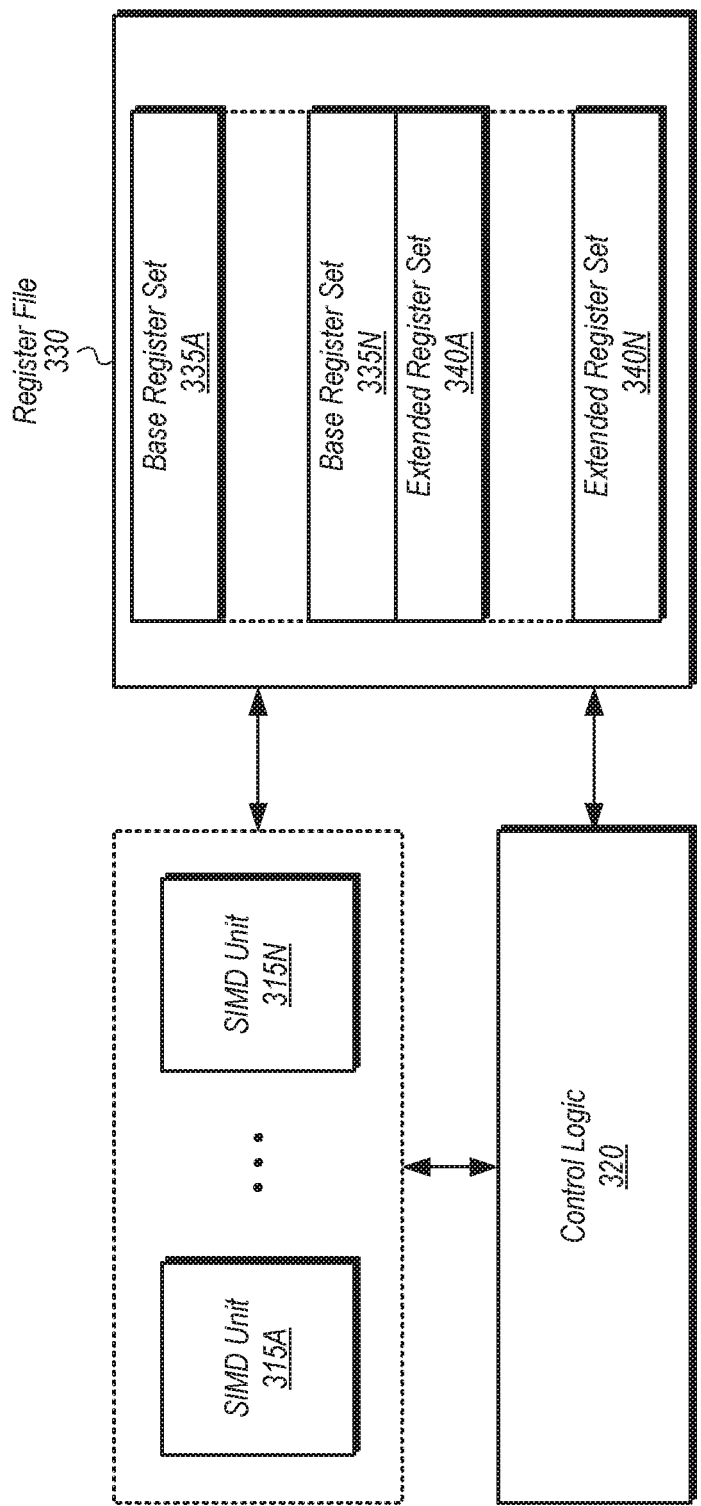
FIG. 3 is a block diagram of one implementation of a compute unit.

Referring now to FIG. 3, a block diagram of one implementation of a compute unit 300 is shown. In one implementation, the components of compute unit 300 are included within each of compute units 255A-N (of FIG. 2). In one implementation, compute unit 300 includes single-instruction, multiple-data (SIMD) units 315A-N, control logic 320, and register file 330. It is noted that compute unit 300 also includes other components (e.g., one or more caches) which are not shown to avoid obscuring the figure. SIMD units 315A-N are representative of any number of SIMD units. In one implementation, control logic 320 manages the assignment, acquisition, and release of registers from register file 330 to the various threads executing on SIMD units 315A-N. In one implementation, control logic 320 also manages the mapping of architectural registers to physical registers within register file 330. While control logic 320 is shown as being separate from SIMD units 315A-N, it is noted that in some implementations, portions of control logic 320 are included within each of SIMD units 315A-N.

Register file 330 includes any number of registers for use by threads executing on SIMD units 315A-N. In one implementation, register file 330 includes a plurality of base register sets 335A-N and a plurality of extended register sets 340A-N. In one implementation, each thread executing on one of SIMD units 315A-N is allocated a given base register set 335A-N for use by the thread. When the thread needs more registers than are available in the given base register set 335A-N, then the thread executes an acquire instruction to gain access to an extended register set 340A-N. When the thread no longer needs the additional registers provided by an acquired extended register set 340A-N, the thread executes a release instruction to relinquish the extended register set 340A-N, allowing a different thread to use the extended register set 340A-N.

The number of registers in each base register set 335A-N varies according to the implementation. In one implementation, the number of registers in each base register set 335A-N is fixed. In another implementation, the number of registers in each base register set 335A-N is variable. In one implementation, the number of registers in each base register set 335A-N is determined by the compiler. In another implementation, a user specifies the number of registers in each base register set 335A-N. In other implementations, the number of registers in each base register set 335A-N is determined in other suitable manners. The number of registers in each base register set 335A-N is also referred to herein as "$B_s$". Also, the number of registers in each extended register set 340A-N varies according to the implementation. Depending on the implementation, the number of registers in each extended register set 340A-N is fixed, is variable, is set by the compiler, set by the user, specified in the acquire instruction, or otherwise. The number of registers in each extended register set 340A-N is also referred to herein as "$E_s$".

The number "N" of base register sets 335A-N varies according to the implementation. Similarly, the number "N" of extended register sets 340A-N varies according to the implementation. It should be understood that the use of the term "N" does not mean that there must be equal numbers of components for the different entities of compute unit 300. For example, in one implementation, the number "N" of SIMD units 315A-N is different from the number "N" of base register sets 335A-N. Also, in one implementation, the number "N" of base register sets 335A-N is different from the number "N" of extended register sets 340A-N.

Figure 4:
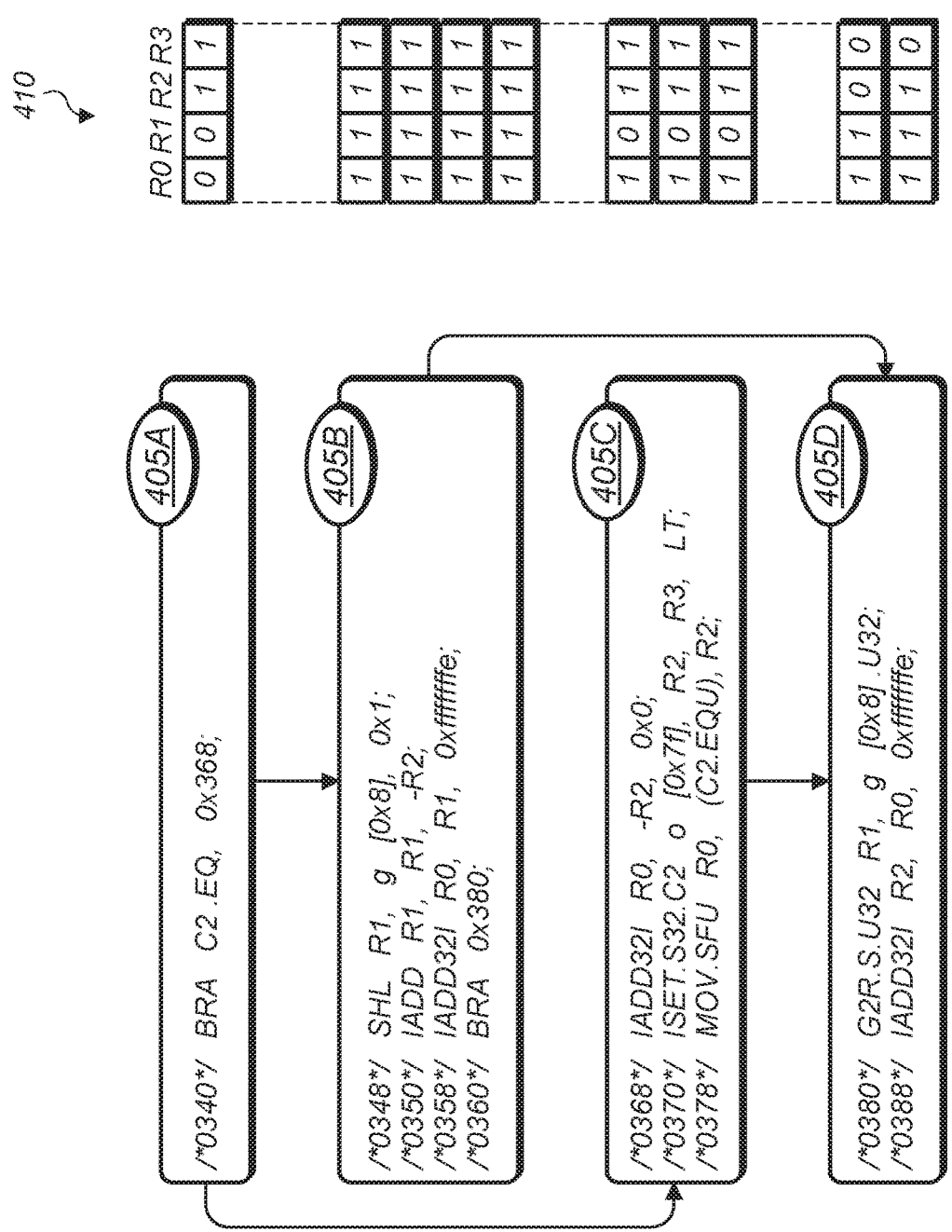
FIG. 4 is a block diagram of one implementation of performing a register liveness analysis.

Turning now to FIG. 4, a block diagram of one implementation of performing a register liveness analysis is shown. The diagram of FIG. 4 illustrates one example of a process for extracting the register usage information for a sequence of instructions. Code blocks 405A-D are shown on the left-side of FIG. 4 to represent one example of program code on which a compiler performs register liveness analysis. The values in diagram 410 on the right-side of FIG. 4 illustrate the liveness of each register R0-R3 when the instructions within code blocks 405A-D are executed. It is noted that code blocks 405A-D are also referred to as "basic blocks".

In one implementation, a compiler performs static, compile-time register liveness analysis to determine how to set the boundaries for extended register set usage by threads of a warp. Register liveness analysis involves determining a software program's register requirements at different instructions so as to instruct the executing microarchitecture to perform extended set acquire or release actions at the appropriate program locations. The static liveness for an architectural index is the set of not necessarily consecutively placed instructions at which the previously written value onto the register has to be held intact if there is a non-zero probability that it will be read later. Within a given sequence of instructions, if an architectural register is written (i.e., defined) at an instruction and read at some later instruction for the last time and without any intervening register definition, all the instructions between the definition point and the last use point are considered "live" for that particular register. Register R1 in code block 405B is an example of this case.

However, in the presence of control flow divergence, liveness analysis is not straightforward because of the unavailability of path traversal information at compile time. If a register is defined before a branch and is used within at least one of the branched basic blocks, the register is considered alive within all of the resultant basic blocks due to the uncertainty of the execution serialization by threads within the warp. In other words, in one implementation, the compiler is conservative in its assumptions. This makes the immediate post-dominator instruction of the branches the first candidate for considering the architectural register "dead". In the example shown in FIG. 4, although register R3 is used within only code block 405C, register R3 is considered alive throughout code block 405B as well. Similarly, if a register is defined within a branch and is going to be used in a post-dominator basic block, then the register is assumed to be alive in other branches. The liveness status of register R2 throughout code block 405B is due to this observation.

In one implementation, a compiler performs the modified analysis on architectural registers in an assembly program. In one implementation, the outcome of the compiler's modified analysis is a collection of boolean vectors each representing the liveness of particular architectural registers at particular instructions. This is illustrated in columns diagram 410 on the right-side of FIG. 4. The information in columns diagram 410 is used in subsequent steps to determine the appropriate size of the extended register set as well as to inject compiler-to-microarchitecture directives at appropriate program locations. For example, in one implementation, a compiler uses static liveness information to determine the size of the extended register set $E_s$. In one implementation the value of $E_s+B_s$ is fixed and is equal to the total number of registers requested by the kernel. Accordingly, selecting either $E_s$ or $B_s$ enforces the value of the other.

In one implementation, after finding the baseline kernel's theoretical occupancy and the contribution of kernel register usage as a limiting factor, candidates are selected for $E_s$ from an empirically-derived set of {0.1, 0.15, 0.2, 0.25, 0.3, 0.35} multiplied by the number of registers used by the kernel. Then, from these products, the even elements are kept which result in the highest occupancy calculated only with the base set size. If multiple candidate elements for $E_s$ give the same theoretical occupancy, the largest element that results in concurrent progress of more than half the warps in the current occupancy in the acquire mode is selected.

In one implementation, additional rules are used to select a value of $E_s$. In one implementation, a first rule stipulates that the distribution of $B_s$ and $E_s$ is chosen so that there are enough registers in the shared pool for at least one warp's $E_s$. This ensures that warps do not stall indefinitely for an acquire instruction. In one implementation, a second rule stipulates that $B_s$ is greater than or equal to the number of live registers at any point in the program that cooperative thread array (CTA)-wide synchronization primitives such as _syncthreads( ) exist. This avoids any deadlock due to inter-dependency of warps. In other words, while a warp A is waiting for another warp B to arrive at a synchronization point, warp B will not wait at an acquire instruction for warp A to release its extended register set. It is noted that a warp is also referred to herein as a "program" or a "multi-threaded program".

Figure 5:
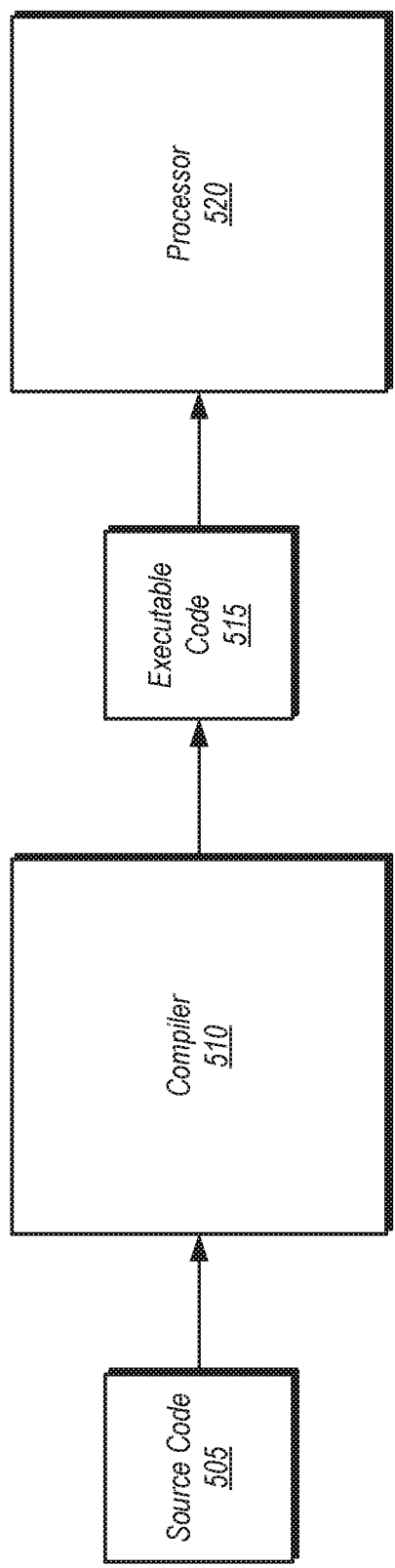
FIG. 5 is a block diagram of one implementation of a computing environment.

Referring now to FIG. 5, a block diagram of one implementation of a computing environment 500 is shown. Computing environment 500 includes a compiler 510 and processor 520. Compiler 510 is a software program executing on a computing system, with the type of computing system varying according to the implementation. Processor 520 is representative of any number and type of processors. In one implementation, processor 520 is a GPU (e.g., GPU 205 of FIG. 2). In another implementation, processor 520 is a CPU. Compiler 510 compiles source code 505 into executable code 515 which is executable by processor 520. In one implementation, processor 520 includes one or more single instruction multiple data (SIMD) units for operating on data in parallel.

In one implementation, compiler 510 inserts acquire and release instructions into executable code 515 at appropriate locations so as to acquire and release extended register sets in processor 520 for the various executing threads. Compiler 510 also inserts instructions into executable code 515 to compact registers from the extended register set to the base register set prior to an inserted release instruction. In one implementation, compiler 510 performs a register liveness analysis to determine where to insert acquire and release instructions into executable code 515. In one implementation, compiler 510 also performs an analysis to determine how to program the sizes of the base register sets and the extended register sets. After recognizing the regions within source code 505 that use an extended register set, compiler 510 injects acquire and release primitives respectively at the beginning and end of such regions.

Figure 6:
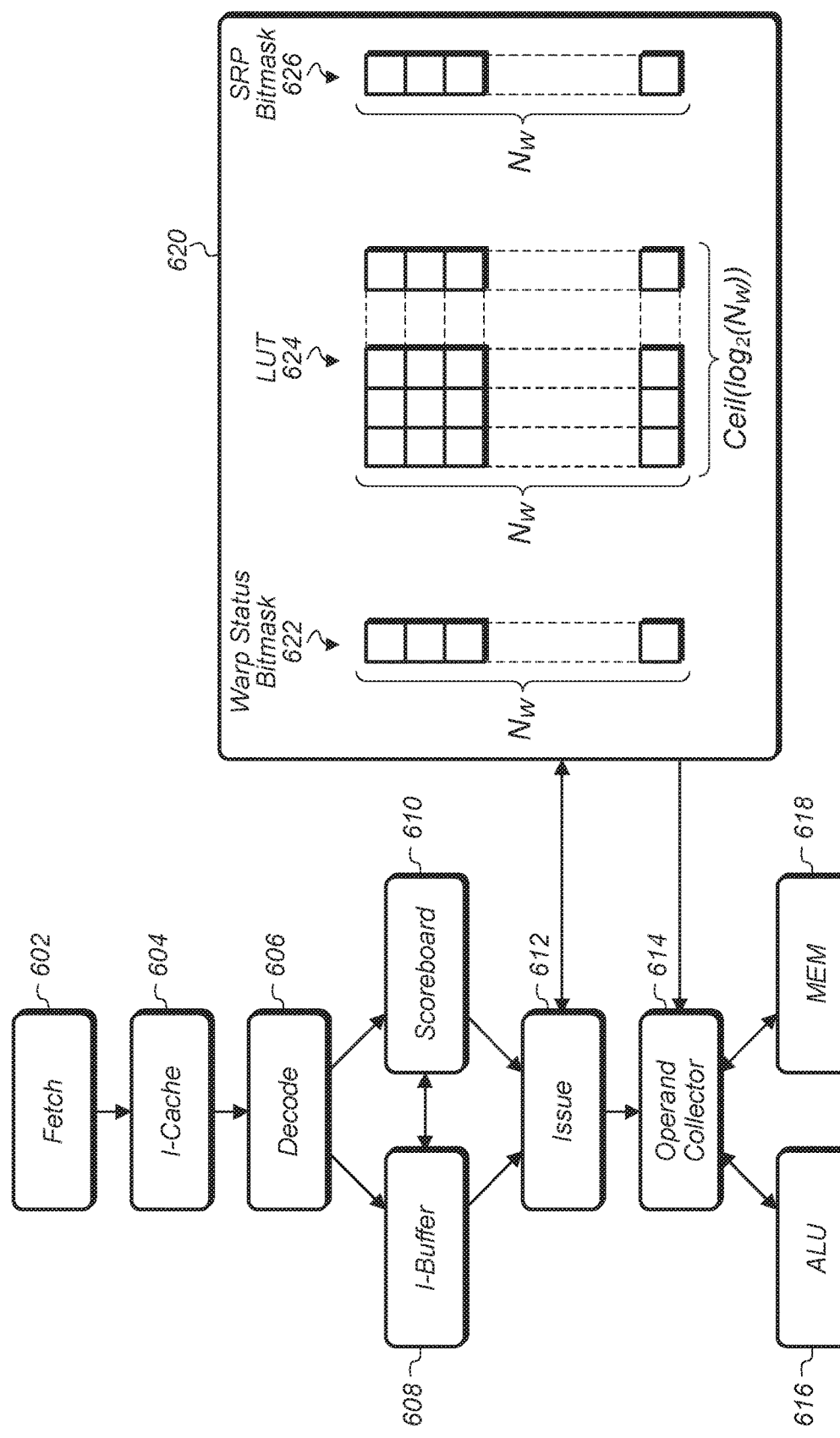
FIG. 6 is a block diagram of one implementation of a processor pipeline and corresponding control logic.

Turning now to FIG. 6, a block diagram of one implementation of a processor pipeline 600 and corresponding control logic 620 is shown. In one implementation, each SIMD unit 315A-N (of FIG. 3) includes a plurality of processor pipelines similar to processor pipeline 600. In one implementation, processor pipeline 600 includes a fetch unit 602 which fetches a sequence of program instructions from a memory and/or cache subsystem. Fetch unit 602 supplies fetched instructions to instruction cache (or i-cache) 604. Decode unit 606 decodes instructions in instruction cache 604 and then provides the instructions to instruction buffer (or i-buffer) 608. Scoreboard 610 keeps track of the status of in-flight instructions. Instruction buffer 608 and scoreboard 610 are coupled to issue unit 612, which issues instructions to the execution units. In one implementation, processor pipeline 600 has two execution units which are arithmetic logic unit (ALU) 616 and memory unit 618. In other implementations, processor pipeline 600 has other numbers and/or types of execution units.

Issue unit 612, ALU 616, and memory unit 618 are coupled to operand collector unit 614. In one implementation, operand collector unit 614 maps architectural register indexes to physical register indexes. Issue unit 612 and operand collector unit 614 are coupled to control logic 620. In one implementation, control logic 620 includes warp status bitmask 622, lookup table (LUT) 624, and shared resource pool (SRP) bitmask 626. In other implementations, control logic 620 includes other circuitry. Warp status bitmask 622 stores a bit for each warp to indicate if the warp has executed an acquire instruction and is currently using an extended register set. It is noted that warp status bitmask 622 is also referred to herein as a "thread status bitmask". LUT 624 stores mappings from warp indexes to SRP indexes to determine which extended register set a given warp is using. SRP bitmask 626 stores a bit for each extended register set to indicate if the extended register set is currently in use. In one implementation, the size of warp status bitmask and SRP bitmask is $N_w$ bits, wherein $N_w$ is the number of warps that are supported by the processor hardware. In this implementation, the number of entries in LUT 624 is also Nw. In one implementation, the number of bits per each entry of LUT 624 is equal to ceiling $(\log_2(N_w))$.

Figure 7:
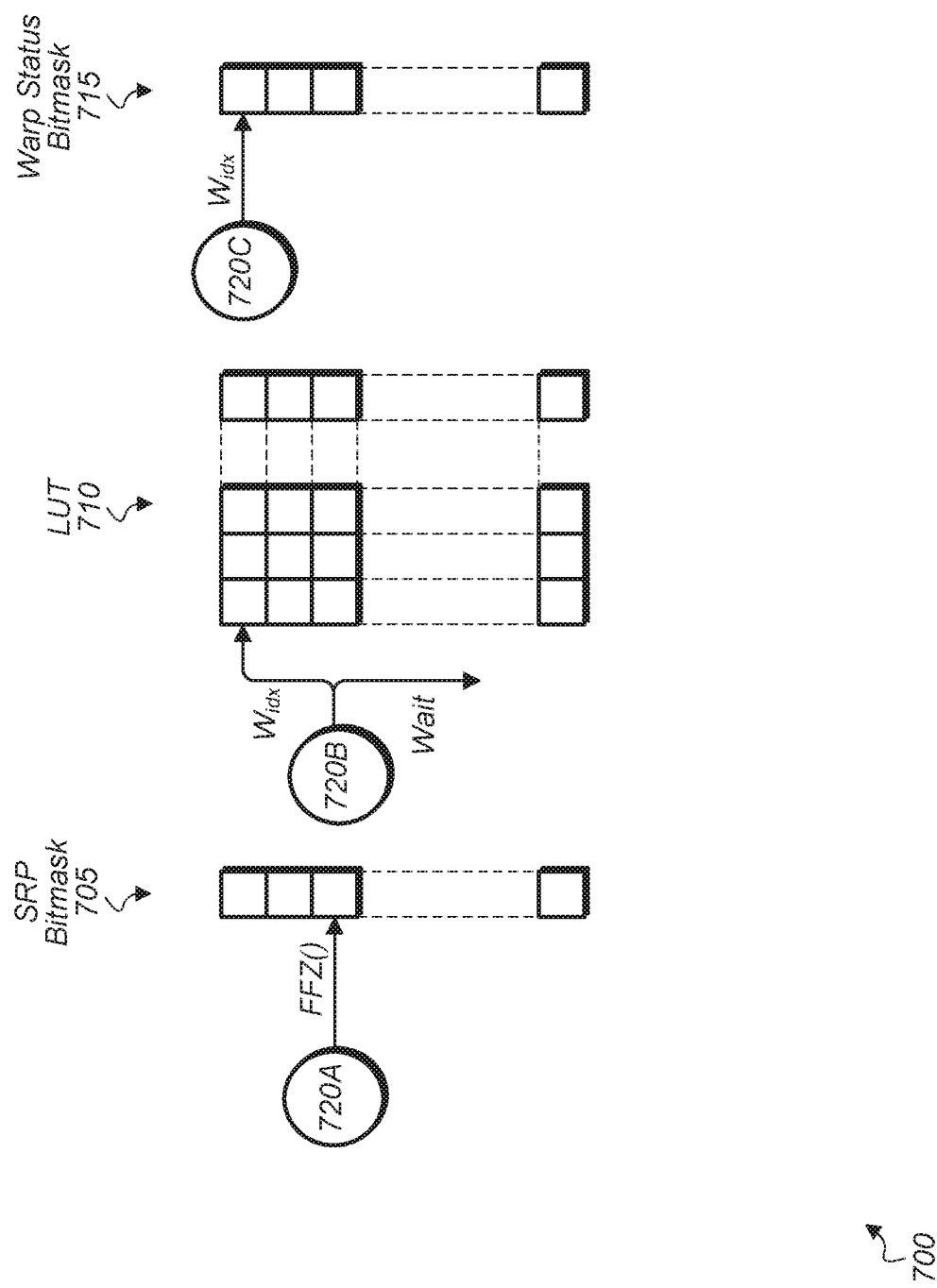
FIG. 7 is a block diagram of one implementation of logic for supporting execution of an acquire instruction.

Referring now to FIG. 7, a block diagram of one implementation of logic 700 for supporting the execution of an acquire instruction is shown. In one implementation, when an acquire instruction reaches the issue stage, SRP bitmask 705 is searched for an unset (i.e., zero) bit in step 720A. In one implementation, a Find First Zero (FFZ) operation is performed on SRP bitmask 705 in step 720A. The FFZ operation returns the index of the least significant zero bit. If a valid index is returned, then an extended register set is available. In this case, the valid index is written into LUT 710 at the entry indicated by $W_{idx}$ (i.e., the warp's index) in step 720B, the warp's status bit in warp status bitmask 715 is set in step 720C, and the SRP availability bit is set in SRP bitmask 705. The SRP index, identifying the assigned extended register set, is then provided to the operand collector unit. If a valid index is not returned, then all extended register sets are already taken, and the warp waits until an extended register set is released by another warp.

In one implementation, each location of warp status bitmask 715 indicates whether a corresponding warp index is already mapped to a shared register pool index. In other words, each bit of warp status bitmask 715 indicates if a corresponding warp has acquired an extended register set. For example, the warp status bitmask 715 includes a bit to indicate the corresponding warp's execution mode, with the mode being either acquired or not acquired. The bitmask 715 is indexed by the warp index (or $W_{idx}$).

LUT 710 maps locations of warp status bitmask 715 to locations of SRP bitmask 705. In other words, LUT 710 maps warps to extended register sets. In one implementation, LUT 710 has one entry for each warp while each entry contains $\log_2 N_w$ bits indicating which one of the $N_w$ SRP sections the warp has acquired (if the warp's status bit is set in warp status bitmask 715). The mapping retrieved from LUT 710 is used to locate a particular bit in SRP bitmask 705. In one implementation, each bit in SRP bitmask 705 indicates if a particular extended physical register set is acquired or not. In other words, a bit in SRP bitmask 705 indicates whether a particular extended physical register set is currently in use or not.

Figure 8:
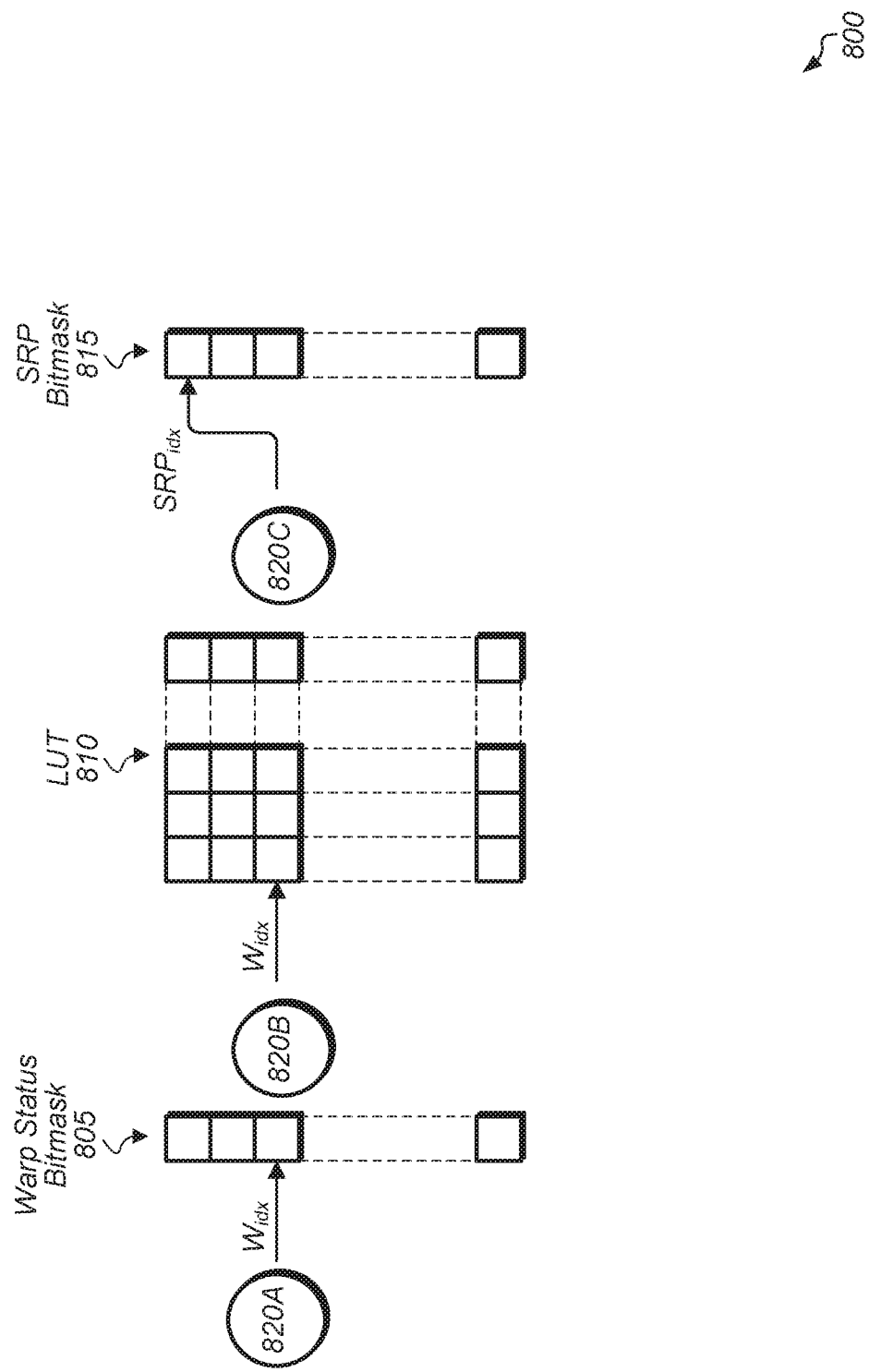
FIG. 8 is a block diagram of one implementation of logic for supporting execution of a release instruction.

Turning now to FIG. 8, a block diagram of one implementation of logic 800 for supporting the execution of a release instruction is shown. When a release instruction arrives at the issue stage, the warp status bit in warp status bitmask 805, in the location specified by $W_{idx}$, is cleared in step 820A, and the warp's acquired SRP section index (i.e., $SRP_{idx}$) is retrieved from LUT 810 in step 820B. This SRP section index determines the bit to clear in SRP bitmask 815. It is noted that an "SRP section index" is also referred to herein as an "SRP index" or an "extended register set index".

When the corresponding bit is cleared in SRP bitmask 815 in step 820C, this signifies that the previously acquired extended register set has been released. It is noted that in some implementations, the extended register set size might not allow for the register file to have the maximum number of SRP sections. In these implementations, the bits in SRP bitmask 815 that do not correspond to an actual SRP section (i.e., extended physical register set) are set at the beginning of the kernel placement and stay intact throughout execution of the kernel.

Figure 9:
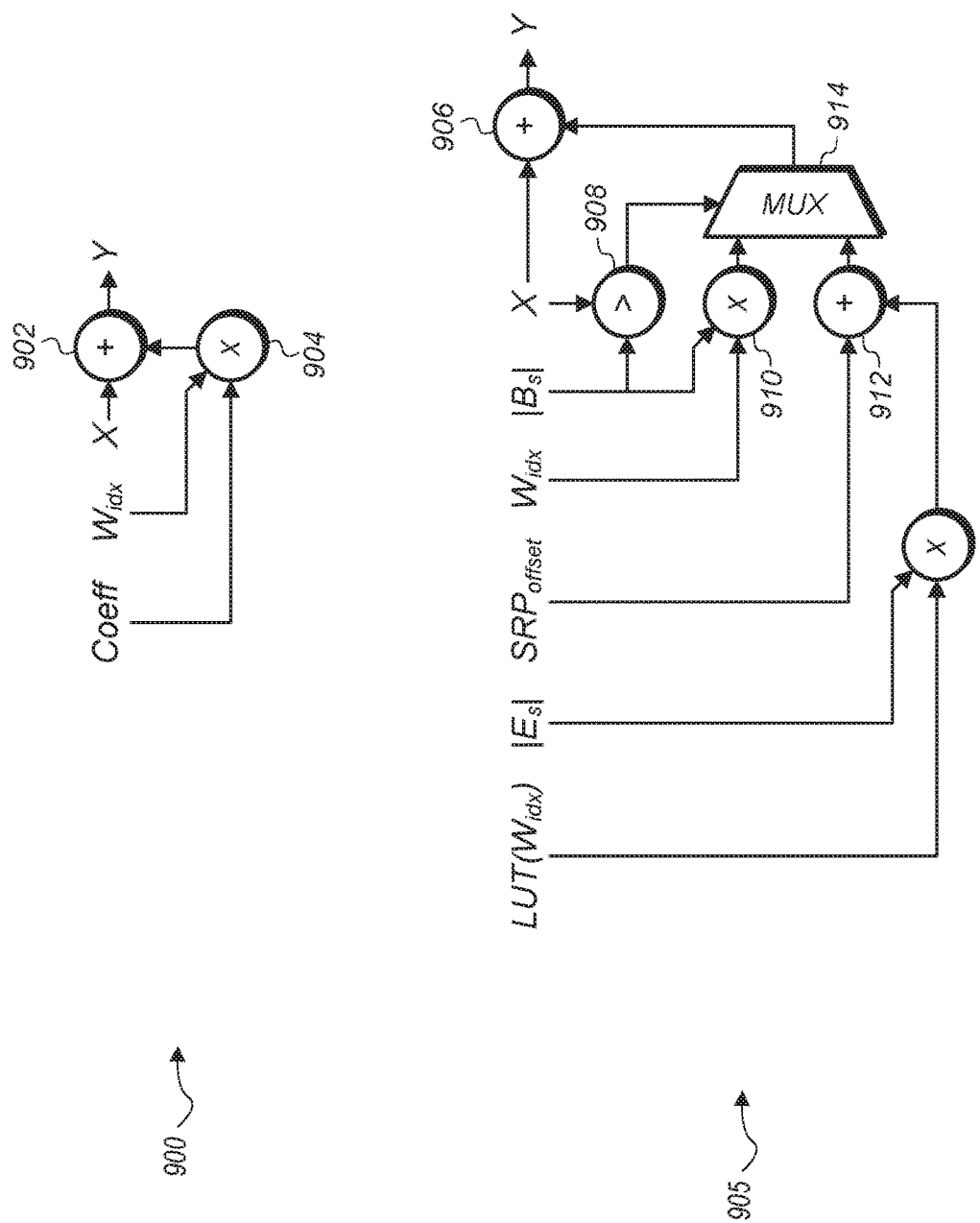
FIG. 9 includes block diagrams of implementations of logic for generating a register index.

Referring now to FIG. 9, block diagrams of implementations of logic for generating a register index are shown. Logic 900 at the top of FIG. 9 shows a traditional approach for generating a physical register index. In this approach, a coefficient is multiplied by the warp index (With) using multiplier 904. In one implementation, the coefficient is determined by the kernel's total register usage. The output of multiplier 904 is coupled to adder 902 and added with the architectural register index "X" to generate the physical register index "Y".

Logic 905 at the bottom of FIG. 9 shows a new approach to generate a physical register index "Y" from an architectural register index "X" for an implementation with a base register set and an extended register set. It is noted that the depictions of $|E_s|$ and $|B_s|$ shown in FIG. 9 represent the sizes of $E_s$ and $B_s$, respectively. In one implementation, the base addresses for physical registers designated to hold the base register set ($B_s$) and the extended register set ($E_s$) of a warp are disjoint, and so the warp compares the architectural register index "X" with $B_s$ to determine if the register belongs to the base set or to the extended set. This is shown as comparison circle 908, with the output of the comparison coupled to the select input of multiplexer (or mux) 914.

If the register belongs to the base set, in a fashion similar to the baseline, the warp index ($W_{idx}$) within the streaming multiprocessor (SM) gets multiplied by $B_s$ to generate the base address for the physical register. The product of the warp index ($W_{idx}$) and $B_s$, generated by multiplier 910, is coupled to one input of mux 914. This product is then passed through to the output of mux 914 and added with the architectural register index "X" by adder 906 to generate the physical register index "Y" when the register belongs to the base set. Otherwise, if the register belongs to the extended set, then the other input of mux 914 is coupled to the output of mux 914. The other input of mux 914 is generated in the following way: The SRP section assigned to the warp (LUT($W_{idx}$)) is multiplied by $E_s$ to get the base address within the SRP. The product of (LUT($W_{idx}$)) and $E_s$, generated by multiplier 916, is added with $SRP_{offset}$, the offset of SRP within the register file, by adder 912, to generate the physical base address for the register. The physical base address for the register is coupled from the output of adder 912 to the other input of mux 914. The output of mux 914 is coupled to adder 906 to be added with the architectural register index "X" to generate the physical register index "Y". In one implementation, the values of $B_s$ and $E_s$ are supplied by the compiler and provided to the operand collector unit at the launch of the kernel. It should be understood that in other implementations, logic 905 includes other components and/or is organized in other suitable manners.

Figure 10:
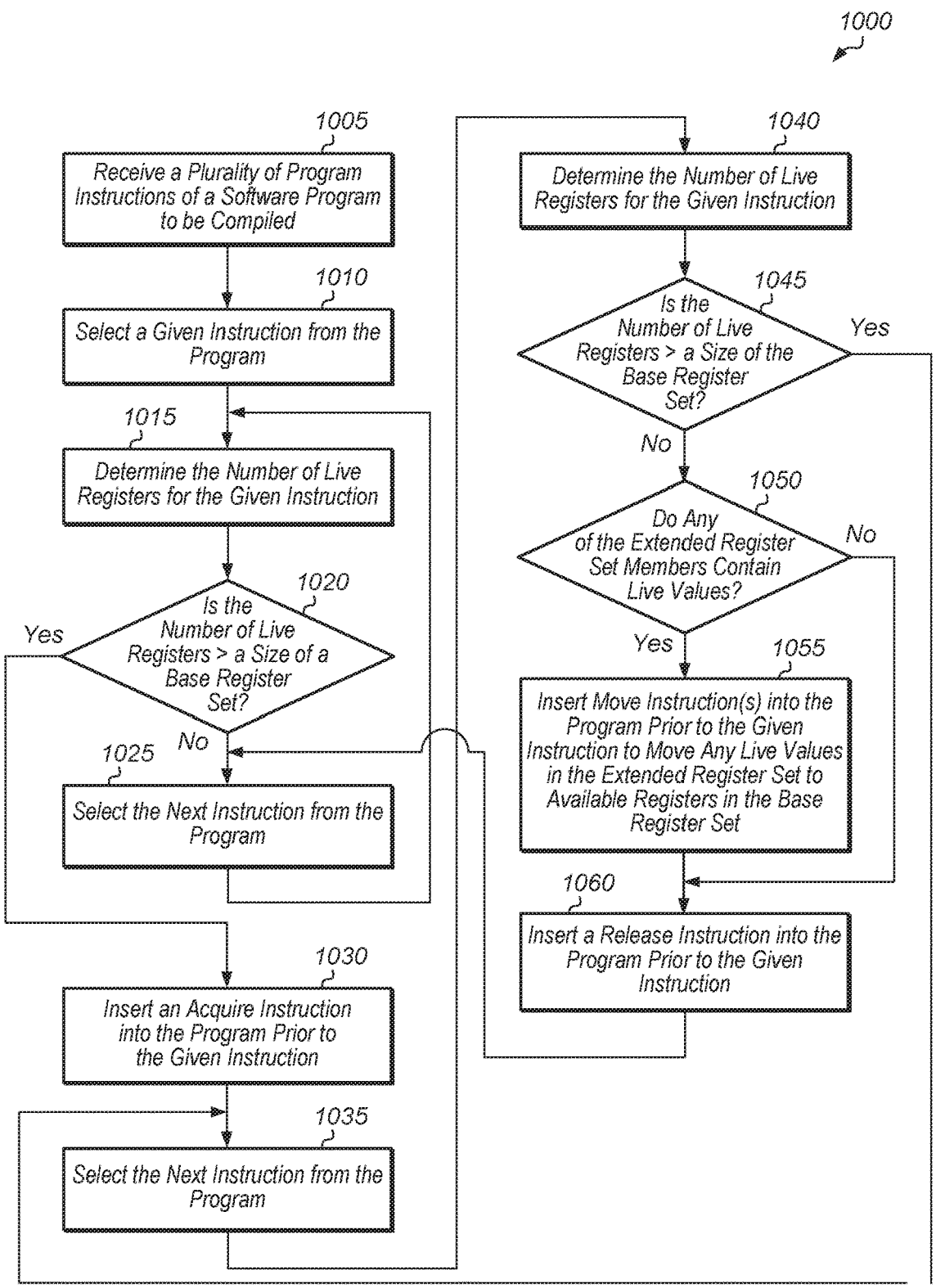
FIG. 10 is a generalized flow diagram illustrating one implementation of a method for a compiler performing a register liveness analysis to determine where in a program to insert acquire and release instructions.
Figure 11:
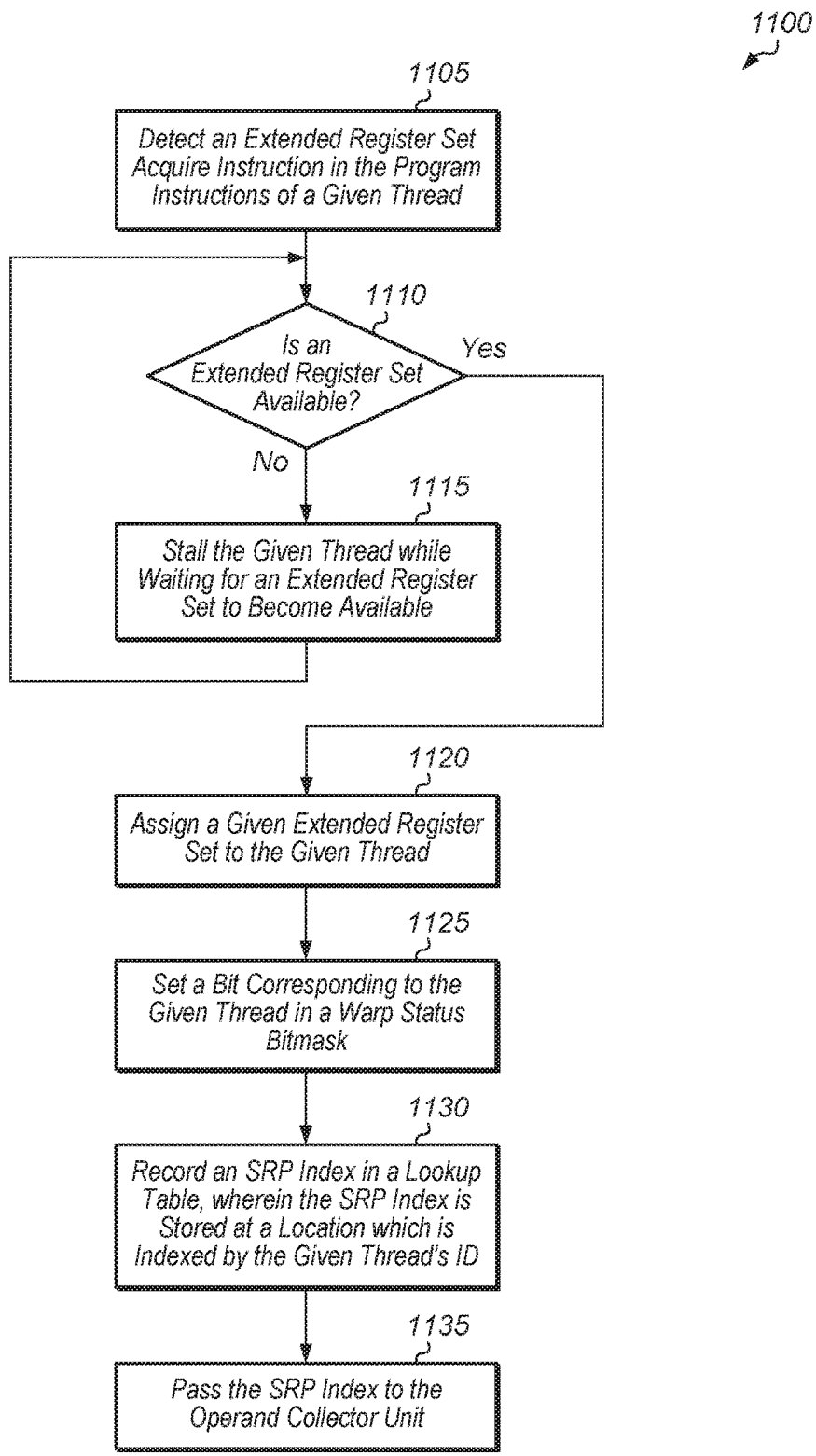
FIG. 11 is a generalized flow diagram illustrating one implementation of a method for executing an extended register set acquire instruction.
Figure 12:
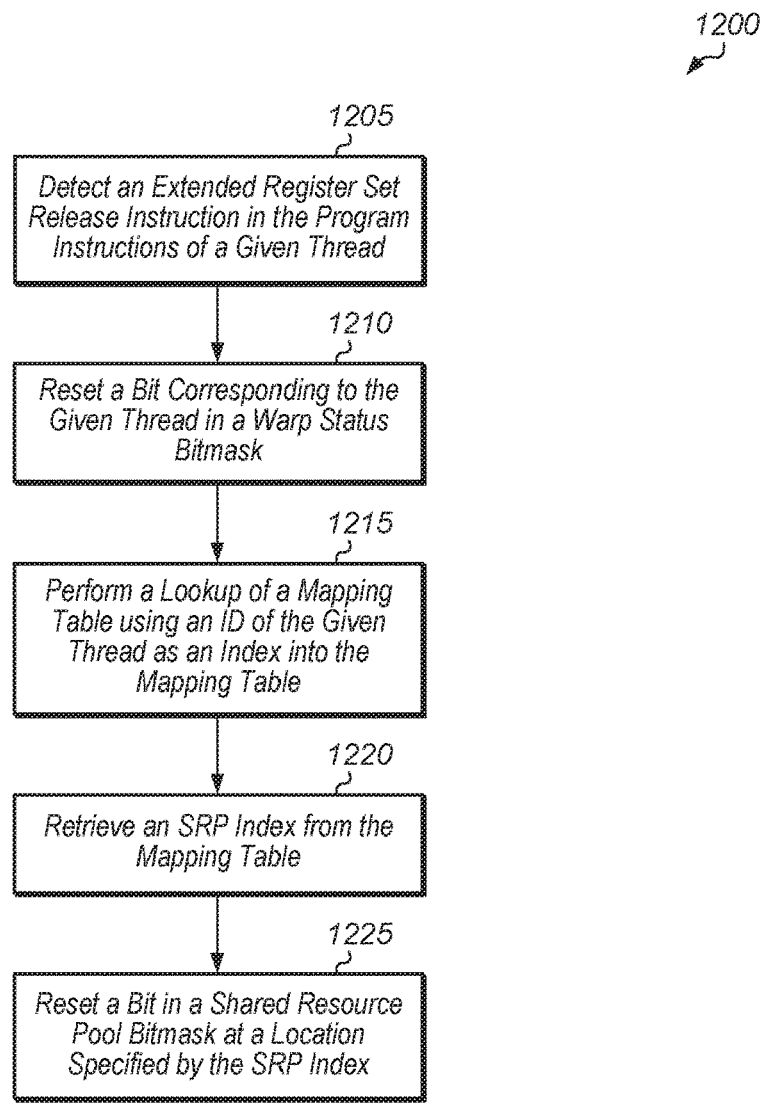
FIG. 12 is a generalized flow diagram illustrating one implementation of a method for executing an extended register set release instruction.
Figure 13:
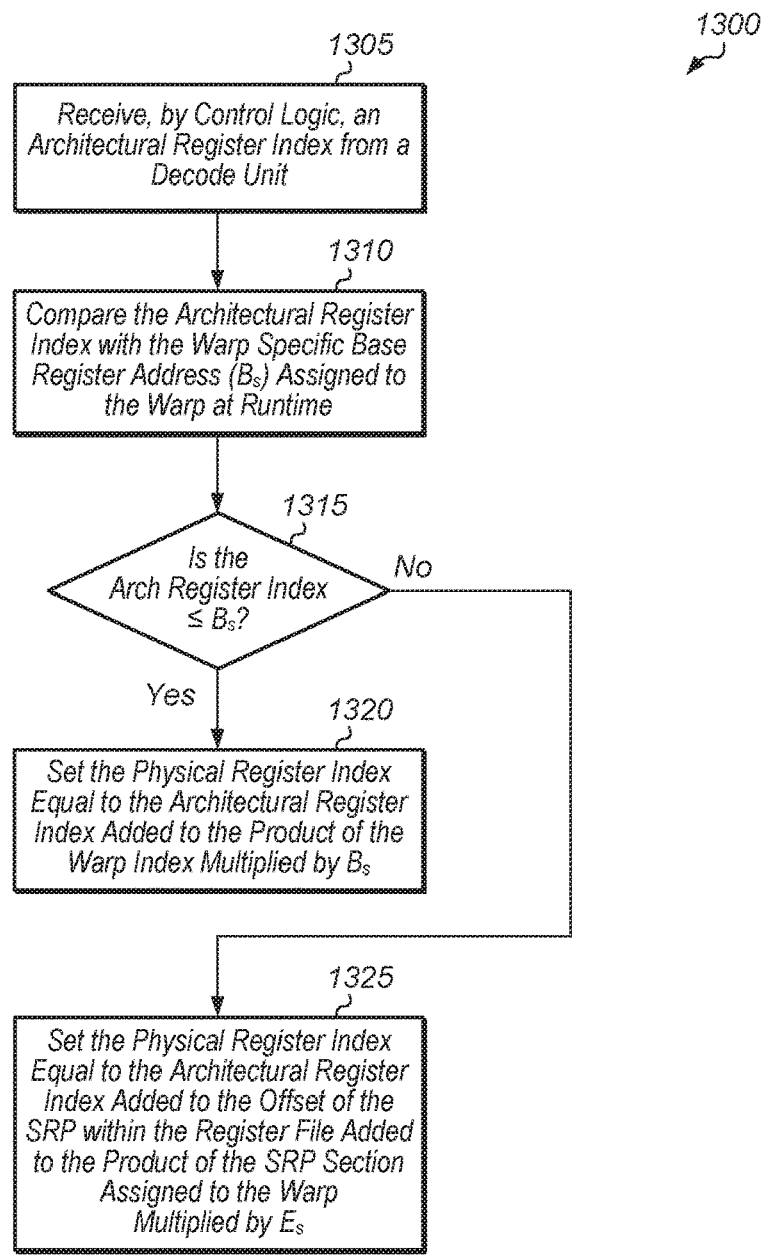
FIG. 13 is a generalized flow diagram illustrating one implementation of a method for mapping an architectural register index to a physical register index.

Turning now to FIG. 10, one implementation of a method 1000 for a compiler performing a register liveness analysis to determine where in a program to insert acquire and release instructions is shown. For purposes of discussion, the steps in this implementation and those of FIG. 11-13 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1000.

The compiler receives a plurality of program instructions of a software program to be compiled (block 1005). Next, the compiler selects a given instruction from the software program (block 1010). On the first iteration through the steps of method 1000, the compiler selects the first instruction in the program. Next, the compiler determines the number of live registers for the given instruction (block 1015).

Then, the compiler determines if the number of live registers is greater than a size of a base register set (conditional block 1020). If the number of live registers is less than or equal to a size of the base register set (conditional block 1020, "no" leg), then the compiler selects the next instruction from the program (block 1025), and then method 1000 returns to block 1015. If there are no more instructions in the program, then method 1000 ends.

If the number of live registers is greater than the size of the base register set (conditional block 1020, "yes" leg), then the compiler inserts an acquire instruction into the program prior to the given instruction (block 1030). It is noted that the "acquire instruction" is also referred to as an "extended register set acquire instruction" herein. After block 1030, the compiler selects the next instruction in the program (block 1035). Then, the compiler determines how many live registers there are during execution of the given instruction (block 1040). Next, the compiler determines if the number of live registers is greater than the size of the base register set (conditional block 1045).

If the number is less than or equal to the size of the base register set (conditional block 1045, "no" leg), then the compiler determines if any of the extended register set members contain live values (conditional block 1050). If any of the extended register set members contain live values (conditional block 1050, "yes" leg), then the compiler inserts move instruction(s) into the program prior to the given instruction to move any live values in the extended register set to available registers in the base register set (block 1055). Next, the compiler inserts a release instruction into the program prior to the given instruction (block 1060).

If none of the extended register set members contain live values (conditional block 1050, "no" leg), then the compiler inserts a release instruction into the program prior to the given instruction (block 1060). When executed by a processor, the release instruction releases the extended register set back into the shared register pool (SRP).

After block 1060, method 1000 jumps to block 1025 with the compiler selecting the next instruction in the program code. If the number of live registers is greater than the size of the base register set (conditional block 1045, "yes" leg), then method 1000 returns to block 1035 with the compiler selecting the next instruction in the program. If there are no more instructions in the program, then method 1000 ends.

Referring now to FIG. 11, one implementation of a method 1100 for executing an extended register set acquire instruction is shown. A processor, executing instructions of a given thread, detects an extended register set acquire instruction in the program instructions for the given thread (block 1105). In one implementation, the processor detects the extended register set acquire instruction when a decoder decodes the instruction. In response to detecting the extended register set acquire instruction, the control logic determines if there is an available extended register set in the shared register pool (SRP) (conditional block 1110). It is noted that the control logic is also referred to herein as "microcode". In one implementation, the control logic searches the SRP bitmask for an unset (i.e., zero) bit to determine if there is an available extended register set in the SRP. If no extended register sets are available (i.e., all of the extended register sets are already assigned to other threads) (conditional block 1110, "no" leg), then the processor stalls the given thread while waiting for an extended register set to become available (block 1115). In other words, the given thread is made ineligible for execution when the given thread needs an extended register set but there are not enough unallocated registers in the shared register pool. After block 1115, method 1100 returns to conditional block 1110. When enough registers become available in the shared register pool, the processor makes the given thread eligible to execute again.

If there is an available extended register set in the shared register pool (conditional block 1110, "yes" leg), then the control logic assigns a given extended register set to the given thread (block 1120). The control logic uses any suitable technique for choosing an extended register set to assign to the given thread when multiple extended register sets are available. In response to assigning a given extended register set to the given thread, control logic of the processor sets a bit corresponding to the given thread in a warp status bitmask (block 1125). Also in response to assigning a given extended register set to the given thread, the control logic records a shared register pool (SRP) section index ($SRP_{idx}$) in a lookup table, wherein the $SRP_{idx}$ is assigned at a location which is indexed by the given thread's identifier (ID) (block 1130). It is noted that an $SRP_{idx}$ is also referred herein to as an ID (or index) of an assigned extended register set. Also in response to assigning a given extended register set to the given thread, the control logic passes the $SRP_{idx}$ to the operand collector unit (block 1135). After block 1135, method 1100 ends. Now that the given extended register set is assigned to the given thread, the given thread is able to use the registers of this given extended register set during execution of the subsequent instructions.

Turning now to FIG. 12, one implementation of a method 1200 for executing an extended register set release instruction is shown. A processor, executing instructions of a given thread, detects an extended register set release instruction in the program instructions for the given thread (block 1205). In one implementation, the processor detects the extended register set release instruction when a decoder decodes the instruction. It is assumed for the purposes of this discussion that any live values in the extended register set have already been moved to available registers in the given thread's base register set prior to the release instruction being executed.

In response to detecting the extended register set release instruction, control logic of the processor resets a bit corresponding to the given thread in a warp status bitmask (block 1210). Next, the control logic performs a lookup of a mapping table using an ID of the given thread as an index into the mapping table (block 1215). Then, the control logic retrieves an $SRP_{idx}$ from the mapping table (block 1220). Next, the control logic resets a bit in a shared register pool bitmask at a location specified by the $SRP_{idx}$ (block 1225). After resetting the bit corresponding to the $SRP_{idx}$ in the shared register pool bitmask, the given extended register set is now available to be assigned to other threads. After block 1225, method 1200 ends.

Referring now to FIG. 13, one implementation of a method 1300 for mapping an architectural register index to a physical register index is shown. Control logic (e.g., an operand collector unit) in the processor receives an architectural register index from a decode unit (block 1305). Next, the control logic compares the architectural register index with the warp specific base register address ($B_s$) assigned to the warp at runtime (block 1310). If the architectural register index is less than or equal to $B_s$ (conditional block 1315, "yes" leg), then the physical register index is set equal to the architectural register index added to the product of the warp index multiplied by $B_s$ (block 1320). Otherwise, if the architectural register index is greater than $B_s$ (conditional block 1315, "no" leg), then the physical register index is set equal to the architectural register index added to the offset of the SRP within the register file added to the product of the SRP section assigned to the warp multiplied by the size of the extended register set ($E_s$) (block 1325). In other words, if the architectural register index is less than or equal to $B_s$ the physical register index is in the base register set and if the architectural register index is greater than $B_s$ it maps to the extended register set. After blocks 1320 and 1325, method 1300 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache;
   one or more execution units comprising circuitry configured to execute instructions fetched from the cache;

a register file comprising a plurality of registers; and
control logic coupled to the one or more execution units and the plurality of registers;
wherein the control logic comprises circuitry configured to:
- allocate a first set of registers from the register file for exclusive use by a first thread executing on a first execution unit of the one or more execution units; and
- in response to detecting that the first thread requires use of an additional number of registers, allocate a second set of registers from the register file for use by the first thread, wherein an index of the second set of registers is at a location indexed by an identifier (ID) of the first thread;
wherein:
- the second set of registers are allocated from a pool of registers shared by a plurality of threads; and
- registers of the pool of registers are allocated for use when any of the plurality of threads need an additional number of registers.

2. The processor as recited in claim 1, wherein allocating the second set of registers for use by the first thread comprises:
- setting a first indicator (SPB) corresponding to the first thread in a thread status bitmask, wherein said first indicator indicates whether or not the first thread is using a register in the second set of registers;
- recording the index of the second set of registers in a lookup table; and
- setting a second indicator corresponding to the second set of registers in a shared register pool bitmask.

3. The processor as recited in claim 2, wherein the processor comprises an operand collector unit configured to map architectural registers to physical registers, and wherein in response to allocating the second set of registers for use by the first thread, the control logic is further configured to provide the index of the second set of registers to the operand collector unit.

4. The processor as recited in claim 2, wherein in response to detecting that the first thread no longer needs the additional number of registers, the control logic is configured to:
- reset the first indicator corresponding to the first thread in the thread status bitmask;
- perform a lookup of the lookup table using an ID of the first thread as an index into the lookup table;
- retrieve the index of the second set of registers from the lookup table;
- reset the second indicator corresponding to the second set of registers in a shared register pool bitmask; and
- allow a second thread to use the second set of registers.

5. The processor as recited in claim 4, wherein in response to detecting that the first thread no longer needs the additional number of registers, the one or more execution units are configured to execute one or more move instructions to move one or more live values from the second set to registers to the first set of registers prior to resetting the first indicator corresponding to the first thread in the thread status bitmask.

6. The processor as recited in claim 1, wherein the processor comprises an operand collector unit configured to:
- receive an architectural register index from the control logic;
- compare the architectural register index to a base register set size;
- responsive to the architectural register index being less than or equal to the base register set size, set a physical register index equal to the architectural register index added to a product of a warp index multiplied by the base register set size;
- responsive to the architectural register index being greater than the base register set size, set the physical register index equal to the architectural register index added to an offset of a shared register pool within the register file added to a product of a shared resource pool section assigned to the first thread multiplied by an extended register set size; and
- provide the physical register index to a first execution unit of the one or more execution units.

7. The processor as recited in claim 1, wherein detecting that the first thread requires use of an additional number of registers comprises detecting an extended register set acquire instruction in program instructions for the first thread.

8. A method comprising:
- executing instructions fetched from a cache by one or more execution units of a processor;
- allocating, by circuitry of control logic of the processor, a first set of registers of a register file comprising a plurality of registers for exclusive use by a first thread executing on the processor; and
- in response to detecting that the first thread requires use of an additional number of registers, allocating a second set of registers from the register file for use by the first thread, wherein an index of the second set of registers is at a location indexed by an identifier (ID) of the first thread;
wherein:
- the second set of registers are allocated from a pool of registers from the register file shared by a plurality of threads; and
- registers of the pool of registers are allocated for use when any of the plurality of threads needs an additional number of registers.

9. The method as recited in claim 8, wherein allocating the second set of registers for use by the first thread comprises:
- setting a first indicator corresponding to the first thread in a thread status bitmask, wherein said first indicator indicates whether or not the first thread is using a register in the second set of registers;
- recording the index of the second set of registers in a lookup table; and
- setting a second indicator corresponding to the second set of registers in a shared register pool bitmask.

10. The method as recited in claim 9, wherein in response to allocating the second set of registers for use by the first thread, the method further comprising providing the index of the second set of registers to an operand collector unit.

11. The method as recited in claim 9, wherein in response to detecting that the first thread no longer needs the additional number of registers, the method further comprising:
- resetting the first indicator corresponding to the first thread in the thread status bitmask;
- performing a lookup of the lookup table using an ID of the first thread as an index into the lookup table;
- retrieving the index of the second set of registers from the lookup table;
- resetting the second indicator corresponding to the second set of registers in a shared register pool bitmask; and
- allowing a second thread to use the second set of registers.

12. The method as recited in claim 11, wherein in response to detecting that the first thread no longer needs the additional number of registers, the method further comprising executing one or more move instructions to move one or more live values from the second set to registers to the first set of registers prior to resetting the first indicator corresponding to the first thread in the thread status bitmask.

13. The method as recited in claim 8, further comprising:
receiving an architectural register index from the control logic;
comparing the architectural register index to a base register set size;
responsive to the architectural register index being less than or equal to the base register set size, setting a physical register index equal to the architectural register index added to a product of a warp index multiplied by the base register set size;
responsive to the architectural register index being greater than the base register set size, setting the physical register index equal to the architectural register index added to an offset of a shared register pool within the register file added to a product of a shared resource pool section assigned to the first thread multiplied by an extended register set size; and
providing the physical register index to a first execution unit of the one or more execution units.

14. The method as recited in claim 11, wherein detecting that the first thread no longer needs the additional number of registers comprises detecting an extended register set release instruction in program instructions for the first thread.

15. A system comprising:
a processor coupled to a memory;
wherein the processor is configured to:
execute instructions fetched from a cache;
allocate a first set of registers of a register file comprising a plurality of registers for exclusive use by a first thread; and
in response to detecting that the first thread requires use of an additional number of registers, allocate a second set of registers from the register file for use by the first thread, wherein an index of the second set of registers is at a location indexed by an identifier (ID) of the first thread;
wherein:
the second set of registers are allocated from a pool of registers from the register file shared by a plurality of threads; and
registers of the pool of registers are allocated for use when any of the plurality of threads needs an additional number of registers.

16. The system as recited in claim 15, wherein allocating the second set of registers for use by the first thread comprises:
setting a first indicator corresponding to the first thread in a thread status bitmask, wherein said first indicator indicates whether or not the first thread is using a register in the second set of registers;
recording the index of the second set of registers in a lookup table; and
setting a second indicator corresponding to the second set of registers in a shared register pool bitmask.

17. The system as recited in claim 16, wherein the processor comprises an operand collector unit configured to map architectural registers to physical registers, and wherein in response to allocating the second set of registers for use by the first thread, the processor is further configured to provide the index of the second set of registers to the operand collector unit.

18. The system as recited in claim 16, wherein in response to detecting that the first thread no longer needs the additional number of registers, the processor is configured to:
reset the first indicator corresponding to the first thread in the thread status bitmask;
perform a lookup of the lookup table using an ID of the first thread as an index into the lookup table;
retrieve the index of the second set of registers from the lookup table;
reset the second indicator corresponding to the second set of registers in a shared register pool bitmask; and
allow a second thread to use the second set of registers.

19. The system as recited in claim 18, wherein in response to detecting that the first thread no longer needs the additional number of registers, the processor is configured to execute one or more move instructions to move one or more live values from the second set to registers to the first set of registers prior to resetting the first indicator corresponding to the first thread in the thread status bitmask.

20. The system as recited in claim 19, wherein the processor comprises an operand collector unit configured to:
receive an architectural register index;
compare the architectural register index to a base register set size;
responsive to the architectural register index being less than or equal to the base register set size, set a physical register index equal to the architectural register index added to a product of a warp index multiplied by the base register set size; and
responsive to the architectural register index being greater than the base register set size, set the physical register index equal to the architectural register index added to an offset of a shared register pool within the register file added to a product of a shared resource pool section assigned to the first thread multiplied by an extended register set size.

* * * * *